(12) United States Patent
Yang et al.

(10) Patent No.: US 10,620,443 B2
(45) Date of Patent: Apr. 14, 2020

(54) VIRTUAL IMAGING DISPLAY DEVICE

(71) Applicants: BOE TECHNOLOGY GROUP CO., LTD., Beijing (CN); Beijing BOE Display Technology Co., Ltd., Beijing (CN)

(72) Inventors: Xiaojian Yang, Beijing (CN); Hui Zheng, Beijing (CN); Shumeng Sun, Beijing (CN); Huaxu Bao, Beijing (CN); Xiaofeng Liu, Beijing (CN); Inho Park, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/772,291

(22) PCT Filed: Sep. 27, 2017

(86) PCT No.: PCT/CN2017/103652
§ 371 (c)(1),
(2) Date: Apr. 30, 2018

(87) PCT Pub. No.: WO2018/153090
PCT Pub. Date: Aug. 30, 2018

(65) Prior Publication Data
US 2019/0079300 A1    Mar. 14, 2019

(30) Foreign Application Priority Data

Feb. 27, 2017    (CN) .................... 2017 2 0183231 U

(51) Int. Cl.
*G02B 27/01*    (2006.01)
*G02B 27/22*    (2018.01)
*G02B 27/02*    (2006.01)

(52) U.S. Cl.
CPC ..... *G02B 27/0176* (2013.01); *G02B 27/0149* (2013.01); *G02B 27/02* (2013.01);
(Continued)

(58) Field of Classification Search
CPC .... G02B 27/01; G02B 27/0176; G02B 27/02; G02B 27/22; G02B 27/0149
See application file for complete search history.

(56) References Cited

U.S. PATENT DOCUMENTS

2005/0012842 A1 * 1/2005 Miyagawa ......... H04N 1/00129
  348/333.01
2006/0038879 A1 * 2/2006 Kremen ................ H04N 19/00
  348/51

(Continued)

FOREIGN PATENT DOCUMENTS

CN    105652446 A    6/2016
CN    205507238 U    8/2016
(Continued)

OTHER PUBLICATIONS

Search Report for International Application No. PCT/CN2017/103652 dated Jan. 5, 2018.

*Primary Examiner* — Kwin Xie
(74) *Attorney, Agent, or Firm* — Calfee, Halter & Griswold LLP

(57) ABSTRACT

A virtual imaging display device includes a base board; a panel configured to be rotatably provided at one of sides of the base board; a lens mounting board configured to be rotatably provided at a side of the panel facing the base board; a projecting lens configured to be mounted on the lens mounting board; and a plurality of half-transmitting mirrors configured to be rotatably provided at remaining sides of the base board, respectively. The virtual imaging display device has a deployed state in which the lens mounting board and the half-transmitting mirrors are configured to abut on each other to define together a frustum structure, and a collapsed state in which the half-transmitting mirrors each are configured to rest on the base board, the lens mounting board is configured to rest on the panel, and the panel is configured to rest on the base board.

16 Claims, 5 Drawing Sheets

(52) U.S. Cl.
CPC ......... *G02B 27/22* (2013.01); *G02B 27/2292* (2013.01); *G02B 2027/015* (2013.01)

(56) References Cited

U.S. PATENT DOCUMENTS

| | | | | |
|---|---|---|---|---|
| 2007/0075917 | A1* | 4/2007 | Nishi | A63F 13/08 345/8 |
| 2010/0157399 | A1* | 6/2010 | Kroll | G03H 1/02 359/11 |
| 2013/0300637 | A1* | 11/2013 | Smits | G02B 27/0176 345/8 |
| 2016/0026253 | A1* | 1/2016 | Bradski | G02B 27/225 345/8 |
| 2016/0178912 | A1* | 6/2016 | Kusuda | G02B 27/0172 359/630 |
| 2018/0095269 | A1* | 4/2018 | Mizoguchi | G02B 27/0172 |

FOREIGN PATENT DOCUMENTS

| | | |
|---|---|---|
| CN | 205507242 U | 8/2016 |
| CN | 205643874 U | 10/2016 |
| CN | 205795142 U | 12/2016 |
| CN | 205899156 U | 1/2017 |
| CN | 106371213 A | 2/2017 |
| CN | 106444031 A | 2/2017 |
| CN | 205942095 U | 2/2017 |
| CN | 206479722 U | 9/2017 |
| JP | 2006262224 A | 9/2006 |

\* cited by examiner

VIRTUAL IMAGING DISPLAY DEVICE

CROSS REFERENCE

The present application is based on International Application No. PCT/CN2017/103652, filed on Sep. 27, 2017, which is based upon and claims priority to Chinese Patent Application No. 201720183231.X, filed on Feb. 27, 2017, and the entire contents thereof are incorporated herein by reference.

TECHNICAL FIELD

The disclosure relates to the technical field of display device, in particular to a virtual imaging display device.

BACKGROUND

With the development of science and technology and economy, people are increasingly pursuing visual enjoyment. An omnidirectional holographic projection system, which is formed by a plurality of half-transmitting mirrors based on the imaging theory of light reflection, has been applied in some fields. However, the conventional virtual imaging devices with a large size are not easy to carry, and have poor portability. Besides, the conventional virtual imaging devices cannot be disassembled conveniently once having been assembled, and thus are prone to collision during transportation.

SUMMARY

According to an aspect of the present disclosure, a virtual imaging display device includes a base board, a panel configured to be rotatably provided at one of sides of the base board, a lens mounting board configured to be rotatably provided at a side of the panel facing the base board, a projecting lens configured to be mounted on the lens mounting board, and a plurality of half-transmitting mirrors configured to be rotatably provided at remaining sides of the base board, respectively, wherein the virtual imaging display device has a deployed state in which the lens mounting board and the half-transmitting mirrors are configured to abut on each other to define a frustum structure, and a collapsed state in which the half-transmitting mirrors each are configured to rest on the base board, the lens mounting board is configured to rest on the panel, and the panel is configured to rest on the base board.

In one embodiment, the panel is formed with a first groove in which the lens mounting board is received in the collapsed state so as not to protrude from a side of the panel facing the base board.

In one embodiment, the projecting lens protrudes from a side of the lens mounting board facing the panel, and the first groove is formed therein with a second groove in which the projecting lens is partly received when the lens mounting board is in the collapsed state so as not to hinder the lens mounting board from resting on a bottom of the first groove.

In one embodiment, the base board is formed with a third groove in which the half-transmitting mirrors are received in the collapsed state so as not to protrude from a side of the base board facing the panel.

In one embodiment, the third groove is formed therein with a fourth groove in which part of the half-transmitting mirrors are received in the collapsed state, and in the collapsed state, the half-transmitting mirrors partly overlap, of which the half-transmitting mirrors in an upper layer are received in the third grooves, while the half-transmitting mirrors in a lower layer are partly received in the fourth groove.

In one embodiment, a side of the base board connected with the panel is provided with a first pivot structure, by which the panel is rotatably connected with the side of the base board.

In one embodiment, a side of the base board connected with the panel is provided with a first stopping member which restricts the panel from turning further in a direction away from the base board when the panel is turned to be perpendicular to the base board.

In one embodiment, sides of the lens mounting board abutting on the half-transmitting mirrors are of a bevel structure, respectively, and sides of the half-transmitting mirror abutting on the lens mounting board are of another bevel structure, respectively, such that the corresponding bevel structures rest on each other when the lens mounting board abuts on the half-transmitting mirrors.

In one embodiment, a plurality of miniature magnets are provided on sides of the lens mounting board abutting on the half-transmitting mirrors, respectively, and a plurality of miniature magnets are provided on sides of the half-transmitting mirrors abutting on the lens mounting board, respectively, such that the lens mounting board and the half-transmitting mirrors magnetically abut on each other by the corresponding miniature magnets.

In one embodiment, each of the half-transmitting mirrors comprises a substrate having two opposite surfaces; and half-transmitting reflective films attached to said two opposite surfaces of the substrate, respectively.

In one embodiment, the panel is a touch panel, and the base board is provided therein with a power supply device which is electrically connected to the touch panel.

In one embodiment, the virtual imaging display device further comprises a controller which is provided on the base board or the panel to control a virtual image of the projecting lens.

In one embodiment, the virtual imaging display device further comprises a wireless signal connection device which is provided on the base board or the panel to receive and feed wireless signals to a virtual image of the projecting lens.

BRIEF DESCRIPTION OF THE DRAWINGS

Various objectives, features and advantages of the present disclosure will become more apparent by considering the following detailed description of, for example, embodiments of the present disclosure in conjunction with the accompanying drawings. The drawings are only for exemplary illustration for the present disclosure, and not necessarily drawn to scale. Through the drawings like numeral references denote the same or similar components, in which.

LIST OF NUMERAL REFERENCES

10—base board, 11—third groove, 12—fourth groove, 13—stopper, 14—protruding structure, 20—panel, 21—first groove, 22—second groove, 30—lens mounting board, 31—level structure, 32—miniature magnet, 40—projecting lens, 50—half-transmitting mirror, 51—rotary shaft, 60—virtual image

DETAILED DESCRIPTION

Typical embodiments that embody the features and advantages of the present disclosure will be described in detail in the following description. It is to be understood that the present disclosure may have various modifications based on various embodiments without departing from the scope of the present disclosure, and that the description and drawings herein are in essence for illustration and not intended to limit the present disclosure.

The following description of the various exemplary embodiments of the present disclosure is made with reference to the accompanying drawings which constitute part of the present disclosure. The exemplary embodiments show various exemplary structures, systems and steps for accomplishing the present disclosure in an exemplary way. It is to be understood that other specific solutions for parts, structures, exemplary devices, systems and steps may be used, and structural and functional modifications may be made without departing from the scope of the present disclosure. Moreover, although in the specification the terms such as "between" and "side" are used to describe various exemplary features and elements of the present disclosure, the terms are used herein only for convenience, for example, to indicate exemplary directions shown in the figures. Any content of the specification shall not be interpreted that a particular three-dimensional direction of a structure is necessary for the structure falls within the scope of the present disclosure.

Figure 1:
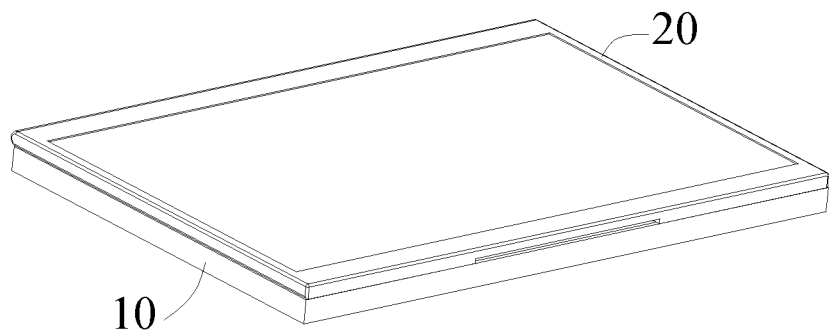
FIG. 1 is a schematic view of stereoscopic structure of a virtual imaging display device in a collapsed state according to an embodiment of the present disclosure.

Refer to FIG. 1 which representatively shows a stereoscopic structural view of a virtual imaging display device capable of embodying the principle of the present disclosure in a collapsed state. In this exemplary embodiment, the virtual imaging display device proposed by the present disclosure is illustrated taking a tablet computer as an example. Those skilled in the art may easily understand that, in order to apply or adapt the virtual imaging display device to other types of display devices or electronic devices, etc., various modifications, additions, substitutions, cancellations or other changes may be made to the following specific embodiments, which changes are still within the scope of the principle of the virtual imaging display device proposed by the present disclosure.

Figure 2:
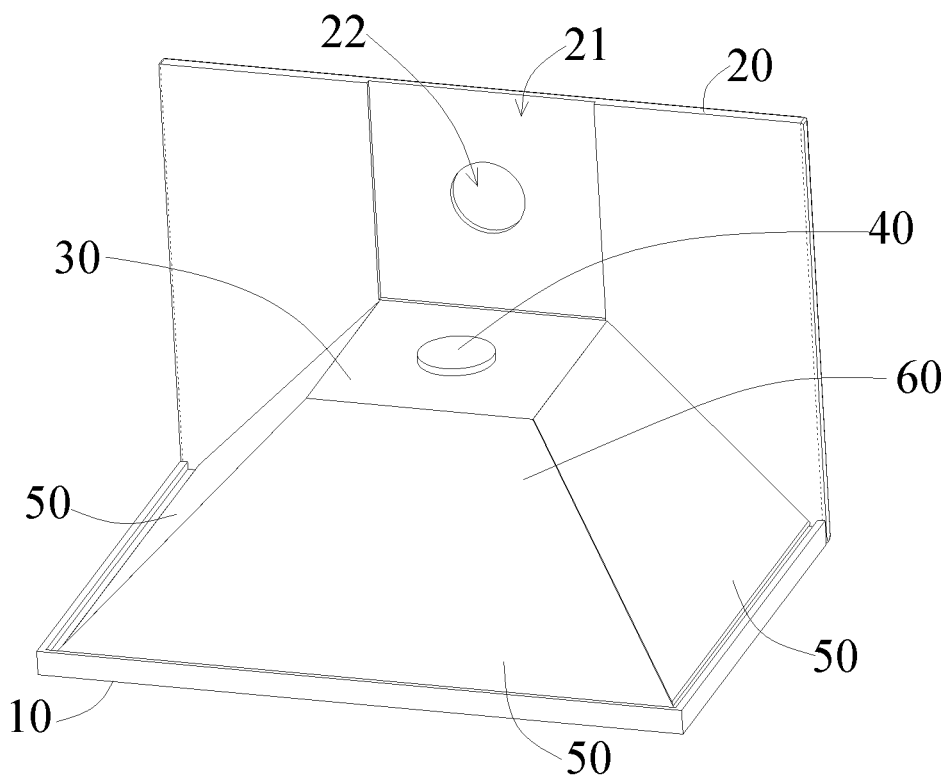
FIG. 2 is a schematic view of stereoscopic structure of the virtual imaging display device of FIG. 1 in a deployed state.
Figure 3:
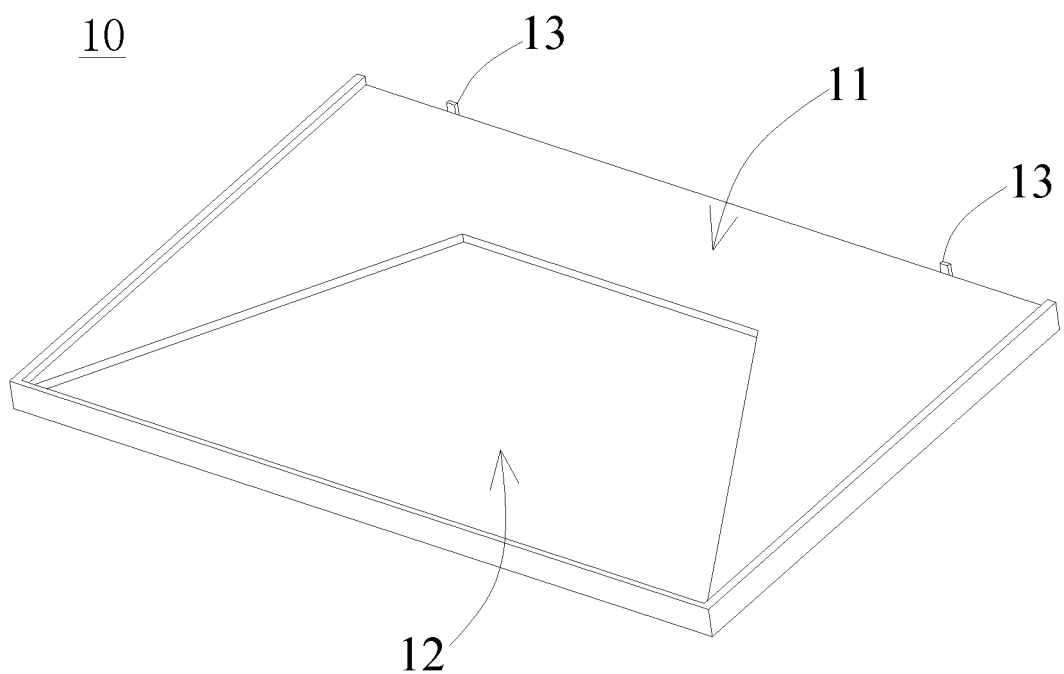
FIG. 3 is a schematic view of stereoscopic structure of the base board of the virtual imaging display device of FIG. 1.
Figure 4:
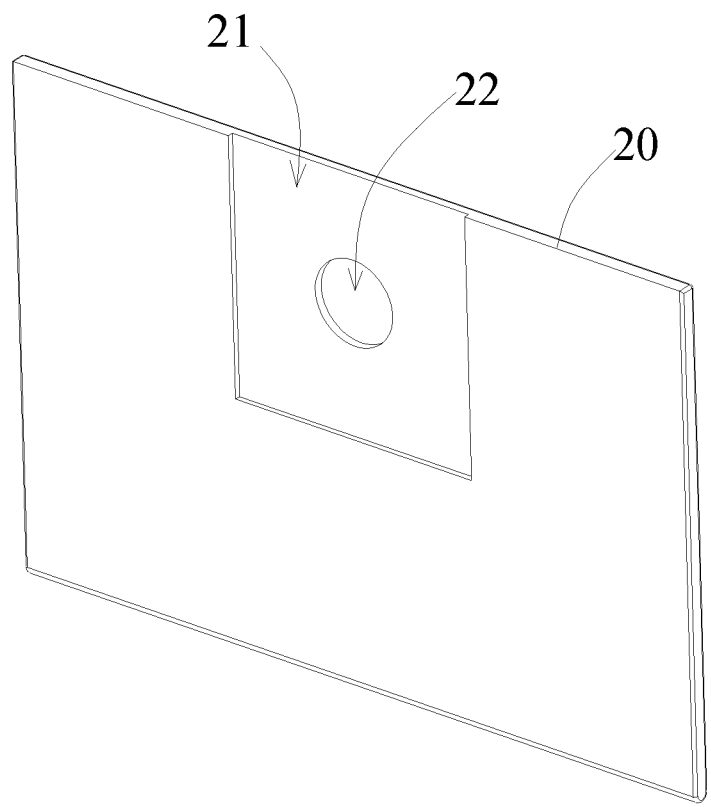
FIG. 4 is a schematic view of stereoscopic structure of the panel of the virtual imaging display device of FIG. 1.
Figure 5:
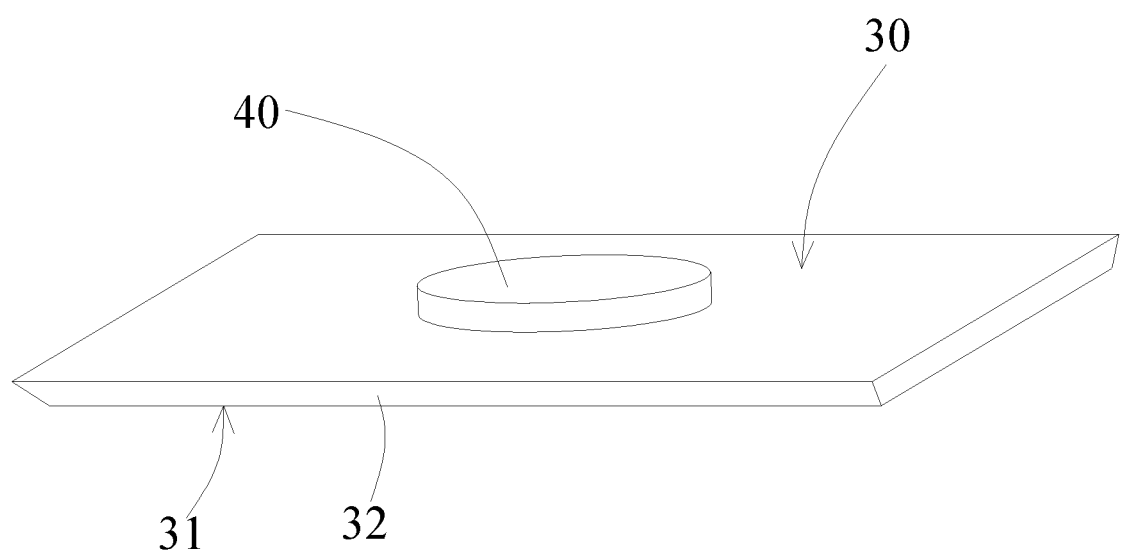
FIG. 5 is a schematic view of stereoscopic structure of the lens mounting board of the virtual imaging display device of FIG. 1.
Figure 6:
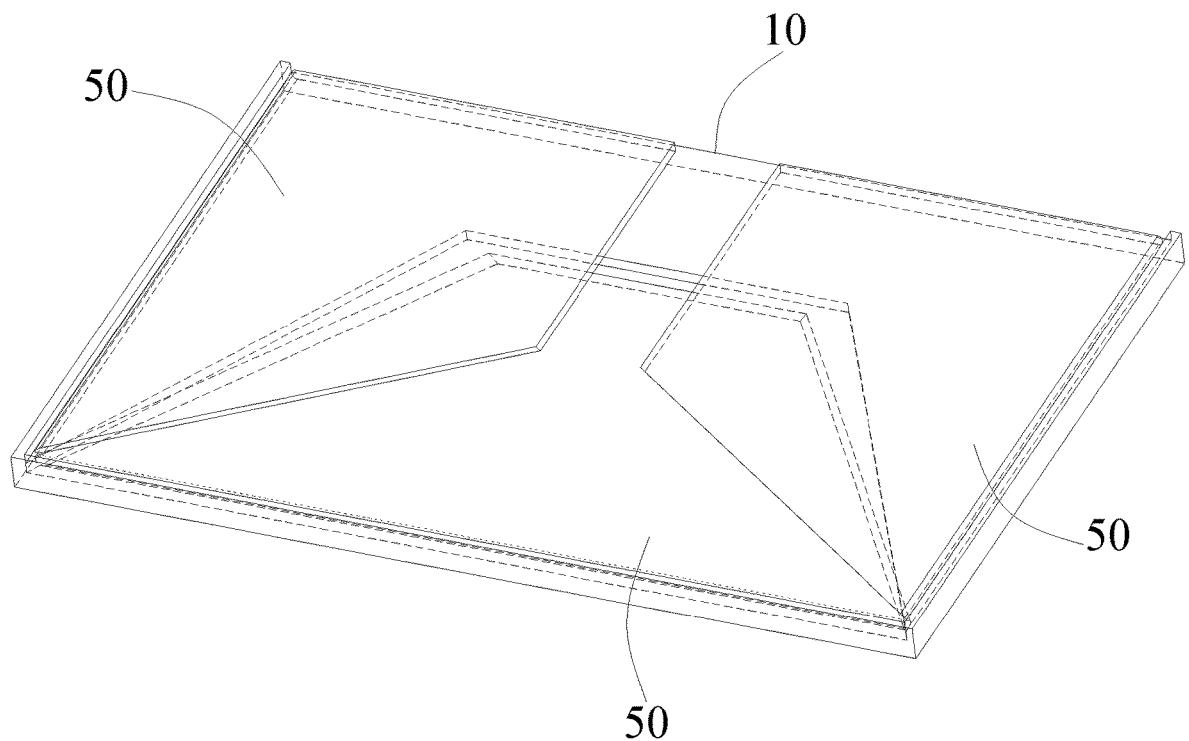
FIG. 6 is a schematic view of stereoscopic assembly of the respective half-transmitting mirrors and the base board of the virtual imaging display device of FIG. 1 in the collapsed state.
Figure 7:
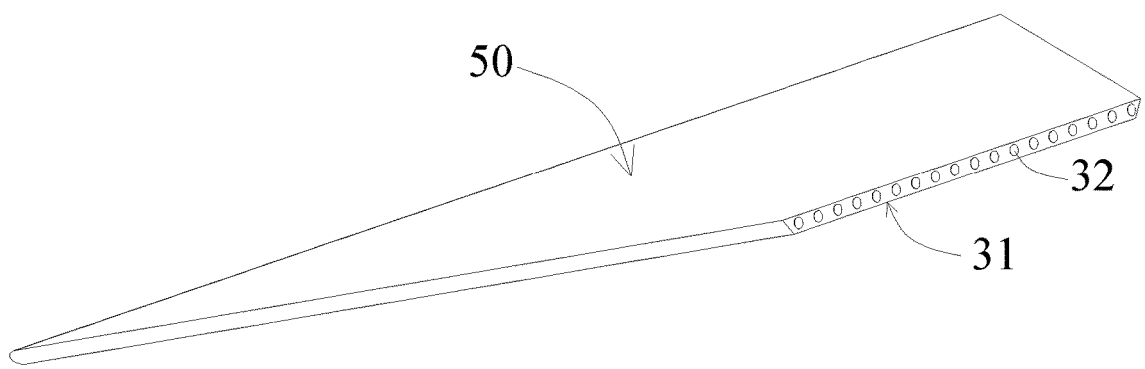
FIG. 7 is a partial sectional view of the respective half-transmitting mirror of the virtual imaging display device of FIG. 1.

As shown in FIG. 1, in the present embodiment, the virtual imaging display device mainly includes a base board 10, a panel 20, a lens mounting board 30, a projecting lens 40, and three half-transmitting mirrors 50. Cooperatively refer to FIG. 2 to FIG. 7 of which FIG. 2 representatively shows a schematic view of stereoscopic structure of the virtual imaging display device in deployed state, FIG. 3 representatively shows a schematic view of stereoscopic structure of the base board 10 of the virtual imaging display device, FIG. 4 representatively shows a schematic view of stereoscopic structure of the panel 20 of the virtual imaging display device, FIG. 5 representatively shows a schematic view of stereoscopic structure of the lens mounting board 30 of the virtual imaging display device, FIG. 6 representatively shows a schematic view of stereoscopic assembly of the respective half-transmitting mirrors 50 and the base board 10 of the virtual imaging display device in the collapsed state, and FIG. 7 representatively shows a partial sectional view of the respective half-transmitting mirror 50 of the virtual imaging display device. Now the main structures and functions of the virtual imaging display device proposed by the present disclosure will be described in detail below in conjunction with the above-mentioned drawings.

As shown in FIGS. 1 to 4, in the present embodiment, the panel 20 is rotatably provided at one of sides of the base board 10. Wherein, the panel 20 may be a device with display function such as LCD, OLED, etc. At the side of the base board 10 connected with the panel 20 may be provided with a first pivot structure which may be, for example, a rotary shaft or other structure. Further, at the side of the base board 10 connected with the panel 20 may be provided with a first stopping member, such as a stopper 13 or other stopping structure, such that when the panel 20 is turned to be perpendicular to or at other determined angles with respect to the base board 10, the impediment by the stopper 13 may be used to restrict the panel 20 from turning further in a direction away from the base board 10, that is, to limit the deploying angle of the panel 20 relative to the base board 10.

In addition, in this embodiment, based on the design that the virtual imaging display device is adapted to a tablet computer, the panel 20 may be used as a touch panel 20, and the base board 10 is provided therein with a power supply device which is electrically connected to the touch panel 20, and through which the base board 10 supplies power to the touch panel 20. Additionally, the power supply device may also supply power to the projecting lens 40 or other power-consuming elements. Or, an additional power supply device(s) may be used. The above embodiments do not have any limitation to the power supply configuration solution for other power-consuming elements of the present disclosure. In this embodiment, the power supply device includes at least a solar cell panel such that the virtual imaging display device may be allowed to absorb and store electric energy in an environment with an external light source, while make use of the electricity discharged by the solar panel to ensure continuous use of the appliance in an environment where charging is not possible or light illumination is insufficient. Based on the above design, the collapsing conversion of the tablet computer and the virtual imaging display device may be realized, and furthermore the emergency requirements for the use of the appliance may be met when the charging is not possible.

As shown in FIG. 2 and FIG. 5, in the present embodiment, the lens mounting board 30 is rotatably provided on a side of the panel 20 facing the base board 10. Taking the touch panel 20 as an example, the side of touch panel 20 facing the lens mounting board 30 is the other side opposite to its touch surface. Here, the side of the panel 20 is formed with a first groove 21 in which the lens mounting board 30, when in the collapsed state, is received, without protruding from the side of the panel 20 facing the base board 10.

Further, given that some types of projecting lens 40, due to their size, protrudes from the side of the lens mounting board 30 facing the panel 20 when being mounted on the lens mounting board 30, in the bottom of the first groove 21 may be formed with a second groove 22 in which the projecting lens 40 is partly received when the lens mounting board 30 is in the collapsed state so as not to hinder the lens mounting board 30 from resting on the bottom of the first groove 21.

As shown in FIGS. 2 and 5, in the present embodiment, the projecting lens 40 may be detachably mounted on the lens mounting board 30. For the needs of different virtual imaging functions, multiple types of projecting lenses 40 may be flexibly selected, and it is appropriate to design the size of the above-mentioned second grooves 22 to satisfy a spare projecting lens 40 with maximum size. The disclosure, however, is not limited thereto.

Figure 8:
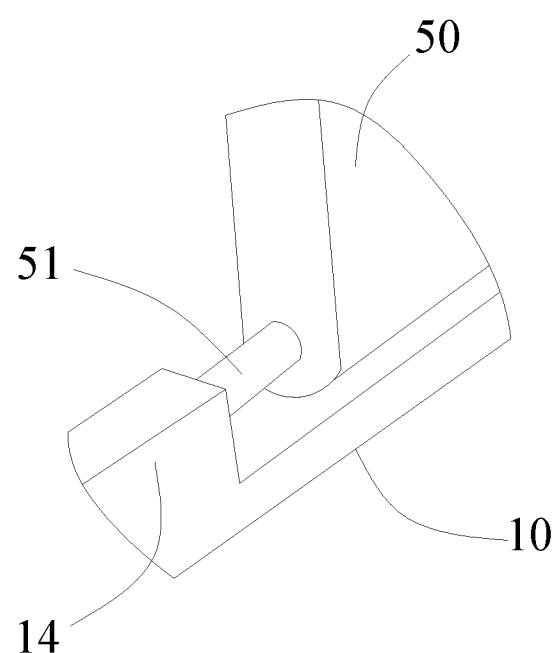
FIG. 8 is a partial enlarged view of the virtual imaging display device of FIG. 1.

As shown in FIGS. 2, 3, and 6, in the present embodiment, three half-transmitting mirrors 50 are rotatably provided on the three sides of the base board 10 other than the side thereof connected with the panel 20, respectively. In order to rotatably provide the respective half-transmitting mirrors 50 on the base board 10, on each of the three sides of the base board 10 connected with the three half-transmitting mirrors 50 may be respectively provided with a second pivot structure which may be, for example, a rotary shaft or other structure. Specifically, in the present embodiment, cooperatively refer to FIG. 8 which shows a partial enlarged view of a half mirror 50 being rotatably connected to the base board 10 through the second pivot structure. As shown in FIG. 8, the second pivot structure may include at least one rotary shaft 51, and a side of the half-transmitting mirror 50 adjacent to the base board 10 is formed with a shaft hole through which the shaft 51 may pass. The shaft 51 has two ends protruding from the shaft hole connected to connection structures of the base board 10, respectively. The connection structures may be protruding structures 14 similar to, but not limited to, a shaft seat. Here, the design for a relative rotation by means of the rotary shaft 51 may be achieved by either allowing a relative fixation of the rotary shaft 51 with respect to the half-transmitting mirror 50 while allowing a relatively pivotal connection of the two as a whole with the base board 10, or allowing a relative fixation of the rotating shaft 51 with respect to the base board 10 while allowing a relative pivoting of the half-transmitting mirror 50 with respect to the rotary shaft 51.

Furthermore, at each side of the base board 10 connected with a half-transmitting mirror 50 may be provided with a second stopping member (not shown), respectively, which restricts the respective half-transmitting mirror 50 from turning further in the direction away from the base board 10 when the half-transmitting mirror 50 is turned at a specific angle, i.e., restricts the deploying angle of the half-transmitting mirror 50 relative to the base board 10. Specifically, the second stopping member may be another stopper structure similar to the stopper 13, but should be designed to avoid affecting the snug collapsing of the base board 10 and the panel 20 in the collapsed state. Alternatively, the second stopping member may be configured in other structures and may be flexibly adjusted in its providing position. For example, it may be provided at the rotation shaft 51 or at the shaft hole of the half-transmitting mirror 50, to directly limit the rotation angle of the rotation shaft 51 with respect to the shaft hole or the base board 10. The disclosure is not limited thereto.

As shown in FIGS. 2, 3 and 6, in the present embodiment, the base board 10 is provided with a third groove 11 in which the half-transmitting mirrors 50 each may be received in the collapsed state so as not to protrude from the side of the base board 10 facing the panel 20. In addition, if only the third groove 11 is provided in the base board 10, it may be possible for half-transmitting mirrors either to partially overlap or not interfere with each other in the third groove 11 due to their sizes and shapes. In this regard, the depth of the third grooves 11 may be determined by comprehensively taking into account conditions such as shapes, sizes and thickness of the half-transmitting mirrors 50 so as to ensure that the collapsed state does not affect the resting of the panel 20 on the base board 10.

Furthermore, as shown in FIGS. 3 and 6, in the present embodiment, in the bottom of the third groove 11 may be formed with a fourth groove 12 in which at least one of the three half-transmitting mirrors 50 is received in the collapsed state. Specifically, when the virtual imaging display device is in the collapsed state, since part of the half-transmitting mirrors 50 may overlap, the design of the fourth groove 12 is taken advantage of to allow part of the half-transmitting mirrors 50 in an upper layer to be received in the third groove 11, while part of the half-transmitting mirrors 50 in a lower layer to be received in the fourth groove 12. In combination with the specific situation of the present embodiment, the one half-transmitting mirror 50 that is positioned opposite to the panel 20 is designed to be received in the fourth groove 12, while the remaining two half-transmitting mirrors 50 that are positioned relative to both sides of the panel 20 are received in the third groove 11, i.e., are stacked on the top of the one half-transmitting mirror 50. In other embodiments, the receiving scheme and the stacking order may be adjusted flexibly based on the design of the fourth groove 12, and are not limited to the present embodiment.

In addition, in the present embodiment, based on the design of the second pivot structures, each second pivot structure, for example, the rotary shaft 51 and the protruding structure like shaft seat 14 of the base board 10, protrudes from the side of the base board 10 facing the panel 20, which is also equivalent to forming a groove structure in the side. When the virtual imaging display device is in the collapsed state, each half-transmitting mirror 50 is received in the groove structure. In this embodiment, the groove structure is the above-mentioned third groove 11.

In addition, in the present embodiment, each half-transmitting mirror 50 may include a substrate having two opposite surfaces such as an upper surface and a lower surface, and half-transmitting reflective films attached to two opposite surfaces of the substrate, respectively. Further, the material of the half-transmitting mirrors 50 may be, for example, but not limited to, polymethyl methacrylate, e.g., perspex, abbreviated as PMMA.

As described above, the virtual imaging display device may be switched between the collapsed state and the deployed state by turning the panel 20, the lens mounting board 30 and the respect half-transmitting mirrors 50. When the virtual imaging display device is in the collapsed state, the lens mounting board 30 rests on the panel 20, i.e., is received in the first groove 21, while the projecting lens 40 is received in the second groove 22. The half-transmitting mirrors 50 each rest on the base board 10, i.e., received in the third groove 11 and the fourth groove 12, respectively. Moreover, the panel 20 and the lens mounting board 30 together rest on the base board 10 and the respective half-transmitting mirrors 50. When the virtual imaging display device is in the deployed state, the panel 20 is substantially perpendicular to the base board 10, the lens mounting board 30 is substantially perpendicular to the panel 20, and the half-transmitting mirrors 50 are turned upward relative to the base board 10 such that the lens mounting board 30 and the half-transmitting mirrors 50 abut on with each other to define altogether a frustum structure for supporting the lens mounting board 30 and enabling the projecting lens 40 to achieve virtual imaging function within the frustum structure.

In addition, it should be noted that in the present embodiment, the present disclosure is described in the context of the tablet computer with a commonly used shape, i.e., a rectangle. However, those skilled in the art will readily understand that the virtual imaging display device may adopt various other shapes, that is to say, all of the shape of the base board 10, the shape of the panel 20, the number and shape of the half-transmitting mirrors 50 may be flexibly adjusted according to the shape of the rotation device for virtual imaging, and shall not be limited to this embodiment.

It should be noted here that the virtual imaging display device shown in the figures and described in this specification is merely one example of a wide variety of virtual imaging display devices that may employ the principles of the present disclosure. It should be clearly understood that the principle of the present disclosure is by no means limited only to any details or any component of the virtual imaging display device shown in the figures or described in this specification.

For example, as shown in FIG. 5, in this embodiment, each side of the lens mounting board 30 abutting on a corresponding half-transmitting mirror 50 is of a bevel structure 31, and each side of half-transmitting mirror 50 abutting on a corresponding lens mounting board 30 is of another bevel structure 31, such that the corresponding bevel structures 31 rest on each other when the lens mounting board 30 abuts on the half-transmitting mirrors 50. Based on the above design, it is possible to avoid occurrence of interference at the abutting positions which would otherwise influence the abutting effect. Similarly, the sides of the half-transmitting mirrors 50 abutting on adjacent half-transmitting mirrors 50 are of bevel structures 31, respectively, such that the corresponding bevel structures 31 rest on each other when the adjacent half-transmitting mirrors 50 abut on each other.

For another example, as shown in FIG. 7, in the present embodiment, a plurality of miniature magnets 32 are provided on the sides of the lens mounting board 30 abutting on the half-transmitting mirror 50, i.e., the aforesaid bevel structures 31, respectively, and a plurality of miniature magnets 32 are provided on the sides of the half-transmitting mirrors 50 abutting on the lens mounting board 30, i.e., the aforesaid another bevel structures 31, respectively, such that the lens mounting board 30 and the respective half-transmitting mirrors 50 magnetically abut on each other by corresponding miniature magnets 32. Based on the above design, it is possible to further ensure the abutting stability when the above structures abut. Similarly, a plurality of miniature magnets 32 are provided on the sides of the half-transmitting mirrors 50 abutting on adjacent half-transmitting mirrors 50, i.e., the aforesaid bevel structures 31, respectively, such that the adjacent half-transmitting mirrors 50 magnetically abut on each other by the corresponding miniature magnets 32.

For still another example, based on the embodiment in which the virtual imaging display device is adapted as a tablet computer, the virtual imaging display device may further include a controller which may be provided on the base board 10 or the panel 20 to control the virtual image 60 of the projecting lens 40. Further, the virtual imaging display device may also include a wireless signal connection device which may be provided on the base board 10 or the panel 20 to receive and feed wireless signals to the virtual image 60 of the projecting lens 40, thereby realizing the remote wireless connection and the remote wireless control functions of the virtual imaging and display device.

The present disclosure provides a virtual imaging display device which, taking advantage of reasonable structure designs for the panel, the lens mounting board, and the half-transmitting mirrors, allows the half-transmitting mirrors and the projecting lens to be conveniently folded and stored, allows the volume of the device to be reduced, and allows the device to be easily carried in the collapsed state. Moreover, the imaging mode and function of the device are expanded by substituting different types of projecting lenses. The conventional virtual imaging devices have a single function of being able to only perform virtual imaging. However, the present disclosure not only has virtual imaging display function, but it may also be used as a tablet computer.

Exemplary embodiments of the virtual imaging display device proposed by the present disclosure are described and/or illustrated in detail above. However, embodiments of the present disclosure are not limited to the specific embodiments described herein, but rather, the components and/or steps of each embodiment may be used independently and separately from other components and/or steps described herein. Each component and/or step of one embodiment may also be used in combination with other components and/or steps of other embodiments. The terms such as "a", "an", "aforesaid", etc., when introducing the elements/components/etc. described and/or illustrated herein, are used to indicate the presence of one or more elements/components/etc. The terms such as "comprise", "include", and "have" are used to indicate a meaning including an opening inclusion, and mean that there may be additional elements/components/etc. other than the listed elements/components/etc. Furthermore, the terms such as "first" and "second" in the claims and the description are used only as references, and do not have any limitation to their subjects.

Although the virtual imaging display apparatus proposed by the present disclosure has been described with reference to various specific embodiments, those skilled in the art will appreciate that the implementation of the present disclosure may be modified within the spirit and scope of the claims.

What is claimed is:

1. A virtual imaging display device comprising:
   a base board;
   a panel, rotatably provided at one of sides of the base board;
   a lens mounting board, rotatably provided at a side of the panel facing the base board;
   a projecting lens, mounted on the lens mounting board; and
   a plurality of half-transmitting mirrors, rotatably provided at each of the three remaining sides of the base board, respectively,
   wherein the virtual imaging display device has a deployed state in which the lens mounting board and the half-transmitting mirrors are configured to abut on each other to define together a frustum structure, and a collapsed state in which the half-transmitting mirrors each are configured to rest on the base board, the lens mounting board is configured to rest on the panel, and the panel is configured to rest on the base board wherein the panel is formed with a first groove in which the lens mounting board is received in the collapsed state so as not to protrude from a side of the panel facing the base board;

wherein the projecting lens protrudes from a side of the lens mounting board facing the panel, the first groove is formed therein with a second groove in which the projecting lens is partly received when the lens mounting board is in the collapsed state so as not to hinder the lens mounting board from resting on a bottom of the first groove;

the base board is formed with a third groove in which the half-transmitting mirrors are received in the collapsed state so as not to protrude from a side of the base board facing the panel, the third groove is formed therein with a fourth groove in which part of the half-transmitting mirrors are received in the collapsed state, and in the collapsed state, the half-transmitting mirrors partly overlap, of which the half-transmitting mirrors in an upper layer are received in the third grooves, while the half-transmitting mirrors in a lower layer are partly received in the fourth groove.

2. The virtual imaging display device according to claim 1, wherein
a side of the base board connected with the panel is provided with a first pivot structure, by which the panel is rotatably connected with the side of the base board.

3. The virtual imaging display device according to claim 1, wherein
a side of the base board connected with the panel is provided with a first stopping member which restricts the panel from turning further in a direction away from the base board when the panel is turned to be perpendicular to the base board.

4. The virtual imaging display device according to claim 1, wherein
sides of the lens mounting board abutting on the half-transmitting mirrors are of a bevel structure, respectively, and sides of the half-transmitting mirror abutting on the lens mounting board are of another bevel structure, respectively, such that the corresponding bevel structures rest on each other when the lens mounting board abuts on the half-transmitting mirrors.

5. The virtual imaging display device according to claim 1, wherein
a plurality of miniature magnets are provided on sides of the lens mounting board abutting on the half-transmitting mirrors, respectively, and a plurality of miniature magnets are provided on sides of the half-transmitting mirrors abutting on the lens mounting board, respectively, such that the lens mounting board and the half-transmitting mirrors magnetically abut on each other by the corresponding miniature magnets.

6. The virtual imaging display device according to claim 1, wherein each of the half-transmitting mirrors comprises:
a substrate having two opposite surfaces; and
half-transmitting reflective films attached to the two opposite surfaces of the substrate, respectively.

7. The virtual imaging display device according to claim 1, wherein
the panel is a touch panel, and
the base board is provided therein with a power supply device which is electrically connected to the touch panel.

8. The virtual imaging display device according to claim 1, wherein
the virtual imaging display device further comprises a controller which is provided on the base board or the panel to control a virtual image of the projecting lens.

9. The virtual imaging display device according to claim 1, wherein
the virtual imaging display device further comprises a wireless signal connection device which is provided on the base board or the panel to receive and feed wireless signals to a virtual image of the projecting lens.

10. The virtual imaging display device according to claim 1, wherein
remaining sides of the base board other than the side connected with the panel are provided with a second pivot structure, respectively, by which the half-transmitting mirrors are rotatably connected with the remaining sides of the base board.

11. The virtual imaging display device according to claim 1, wherein
a side of the base board connected with the panel is provided with a first pivot structure, by which the panel is rotatably connected with the side of the base board, and
remaining sides of the base board other than the side connected with the panel are provided with a second pivot structure, respectively, by which the half-transmitting mirrors are rotatably connected with the remaining sides of the base board.

12. The virtual imaging display device according to claim 1, wherein
sides of the half-transmitting mirrors abutting on adjacent half-transmitting mirrors thereof are of bevel structures, respectively, such that the corresponding bevel structures rest on each other when the adjacent half-transmitting mirrors abut on each other.

13. The virtual imaging display device according to claim 1, wherein
sides of the lens mounting board abutting on the half-transmitting mirrors are of a bevel structure, respectively, and sides of the half-transmitting mirror abutting on the lens mounting board are of another bevel structure, respectively, such that the corresponding bevel structures rest on each other when the lens mounting board abuts on the half-transmitting mirrors, and
sides of the half-transmitting mirrors abutting on adjacent half-transmitting mirrors thereof are of bevel structures, respectively, such that the corresponding bevel structures rest on each other when the adjacent half-transmitting mirrors abut on each other.

14. The virtual imaging display device according to claim 1, wherein
a plurality of miniature magnets are provided on sides of the half-transmitting mirrors abutting on adjacent half-transmitting mirrors thereof, respectively, such that the adjacent half-transmitting mirrors magnetically abut on each other by the corresponding miniature magnets.

15. The virtual imaging display device according to claim 1, wherein
a plurality of miniature magnets are provided on sides of the lens mounting board abutting on the half-transmitting mirrors, respectively, and a plurality of miniature magnets are provided on sides of the half-transmitting mirrors abutting on the lens mounting board, respectively, such that the lens mounting board and the half-transmitting mirrors magnetically abut on each other by the corresponding miniature magnets, and
a plurality of miniature magnets are provided on sides of the half-transmitting mirrors abutting on adjacent half-transmitting mirrors thereof, respectively, such that the adjacent half-transmitting mirrors magnetically abut on each other by the corresponding miniature magnets.

16. The virtual imaging display device according to claim 1, wherein the virtual imaging display device further comprises a controller which is provided on the base board or the panel to control a virtual image of the projecting lens.

* * * * *